Figure 1:
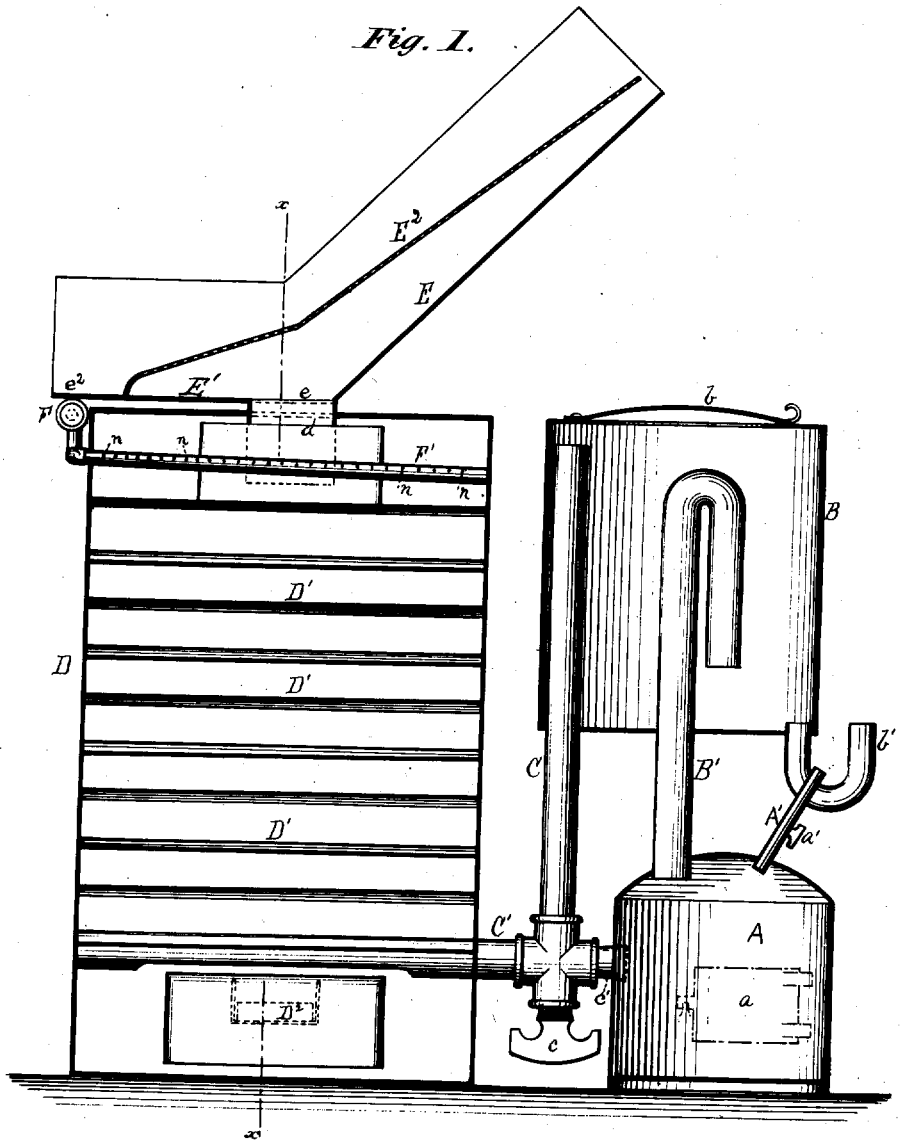

2 Sheets—Sheet 1.

F. RANDON.

TREATING CANE JUICE.

No. 7,038.

Reissued April 4, 1876.

*Witnesses:*
Edwin James.
John K. Jones.

*Inventor:*
Francois Randon.
per J. E. F. Holmead.
Attorney.

2 Sheets—Sheet 2.
F. RANDON.
TREATING CANE JUICE.
No. 7,038. Reissued April 4, 1876.
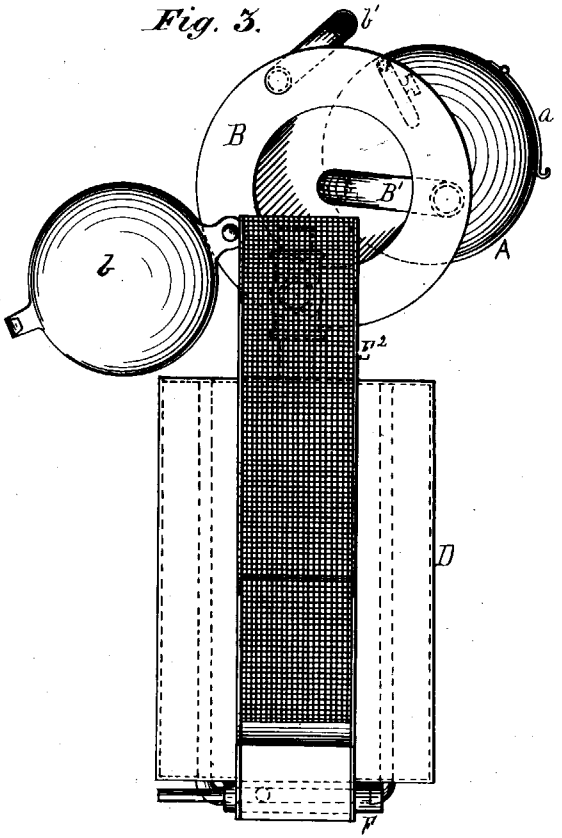
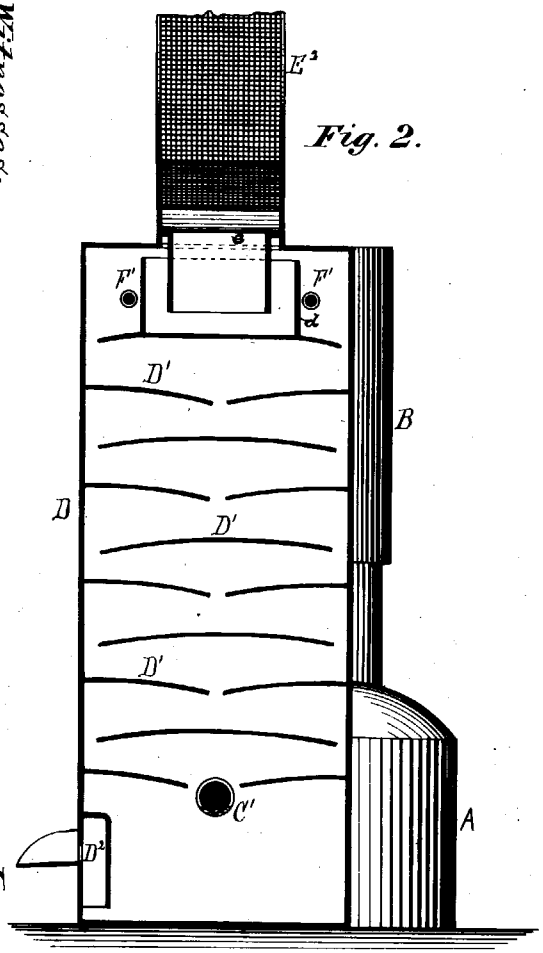
Witnesses:
Edwin James.
John K. Jones.
Inventor:
Francois Randon.
per J. E. T. Holmead.
Attorney.

UNITED STATES PATENT OFFICE.

FRANÇOIS RANDON, OF NEW ORLEANS, LOUISIANA.

IMPROVEMENT IN TREATING CANE-JUICE.

Specification forming part of Letters Patent No. 158,979, dated January 19, 1875; reissue No. 7,038, dated April 4, 1876; application filed March 20, 1876.

DIVISION A.

*To all whom it may concern:*

Be it known that I, FRANÇOIS RANDON, of New Orleans, in the parish of Orleans and State of Louisiana, have invented an Improved Apparatus for Treating Cane-Juice, on which Letters Patent of the United States were granted to me January 19, 1875, No. 158,979; that I am now the sole owner of said Letters Patent, and that the following is a full, clear, and exact description of the same, reference being had to the accompanying drawing, and the letters of reference marked thereon, making part of this specification, in which—

Figure 1 is a side view. Fig. 2 is a vertical sectional view on the line *x x*, Fig. 1. Fig. 3 is a top-plan view.

The nature of my invention consists in arranging, in connection with a suitable generator, where the fumes or gases of sulphur are generated, a receiving-vessel, which shall be supplied with granulated coke, submerged or swimming in a concentrated solution of carbonate of soda, these vessels being so connected that as rapidly as the fumes are generated from the burning sulphur they shall pass to the vessel containing the coke and soda. The gaseous sulphurous acid, containing sulphuric acid derived from the combination of the sulphurous acid with one equivalent of oxygen which the air introduced into the generator to aid the combustion or burning of the sulphur furnishes, decomposes the carbonate of soda in the receiver, and the carbonic acid being liberated, together with the sulphurous acid which remains, by suitable pipes or other connections, is to be conveyed to the column through which the cane-juice or other liquidized saccharine matter passes, there to aid in drying and decolorating or bleaching the same. My invention also consists in employing, in connection with a suitable chamber or column provided with trays or partitions over which the cane-juice falls and passes, a steam-injector and perforated pipe or tube secured at the upper section of said column or chamber, the same being so arranged as to discharge a continuous spray in and among the juice as it falls or passes into the column.

The construction and operation of my invention are as follows: A is a generator, and is constructed of cast-iron or any other suitable material, and may be of any desired form and dimensions. This generator is provided with a suitable door or opening, *a*, through which the sulphur to be burned is introduced. This generator is provided at its dome with a register or tube, A′, through which air to accelerate or quicken the burning or combustion of the sulphur is admitted. This tube is provided with a cock or valve, *a′*, through which the quantity of air to be supplied is regulated at pleasure, and shut off when occasion requires. The sulphur as it burns generates a gaseous sulphurous acid, and which, owing to the air introduced through the tube A′, has commingled some sulphuric acid. These combined gaseous acids thus produced, as rapidly as generated, escape by the pipe B′ to the receiving-vessel B. Owing to the form and arrangement of this pipe B′, and as clearly shown in Fig. 1, the gases thus supplied are discharged at the lower section of said receiving-vessel B. This vessel B, like the generator A, may be constructed of cast-iron or any other suitable material, and is to be filled to near its upper surface with granulated coke broken into fine particles. This is to be submerged in a strong solution of carbonate of soda. The coke itself is simply used to augment or increase the surface in which the soda acts, and thus cause the gases to be more thoroughly brought into contact with said soda. As the gaseous combination of sulphurous and sulphuric acid enters at the lower section of the vessel B, being light and volatile, it will freely pass up through the particles of coke, and as these are, as it were, swimming in the solution of carbonate of soda, the result is that the acid gases are brought necessarily into direct and positive contact with the soda, and which will so act on the carbonate of soda as to produce a carbonic acid, and which, with the sulphurous acid which remains, will pass to the upper section or dome of the receiving-vessel B. These gases are conveyed by a pipe, C, which enters the vessel B, and has its opening or orifice at a section of the vessel above that which the coke and solution of soda occupy, to the pipe C′, which enters at the lower section of the chamber or column D. *b* is a door or opening, through which the coke and soda are supplied; and *b'* is a curved pipe or elbow connected with an opening at the lower section of the vessel B, and whose discharge-opening on the outer surface of the cylinder extends up above the base of said vessel. This tube serves in emptying the vessel B when it is desired to supply a fresh charge of the solution. These pipes C C', which serve to convey the gases from the receiving-vessel B to the lower section of the column D, are provided, respectively, with screws and nuts or cocks *c* and *c'*, by means of which they are readily cleansed, should they, from any cause, become obstructed.

D is a chamber or column, and is designed to act in a manner substantially similar to the ordinary column used in connection with alcoholic stills. This column D may be of any desired form and dimensions, and is constructed of wood or other suitable material. At its upper section this column D is provided with a tubular or other opening, *d*, through which the juice supplied by and through the sieve-trough E is fed to the column. This column D is provided with a series of partitions or trays, $D^1$ $D^1$, of an elliptical form, which are arranged as clearly shown in Fig. 2. This trough or chute E is constructed of wood or other material, and is of the form clearly shown in Fig. 1. In its bottom $E^1$ is an opening, *e*, which registers with the opening *d* of the column D, and through which the juice, strained and freed from its impurities, is fed. The juice is strained by means of the angular supplemental bottom $E^2$, with which the trough E is provided. The bottom $E^2$ is of the form shown in Fig. 1, and is constructed of haircloth or other suitable sieve material, as illustrated in Figs. 1, 2, and 3.

A further description of this trough or chute is unnecessary here, as it is fully described and claimed in a division of this reissue, and where it constitutes its distinctive subject-matter.

It will readily be seen that as the juice thus strained enters through the opening *d* of the column it is discharged on the upper of the trays, and from thence falls and flows in broken sections down to the next tier of trays, and so on down and over the next, thus passing, as it were, in a zigzag channel through and over the entire series. This breaking or disintegration of the column of the juice by its passage over the series of trays so separates the juice as in the most perfect manner to subject the entire mass to the direct and positive action of the gases introduced through the pipe C', and which, rising up through the juice, so mixes and commingles with the same as not only to insure its bleaching, but also greatly to aid in drying the same. The juice, being thus treated, is drawn off through the opening $D^2$ at the base and rear section of the column D.

F is a suitable steam-injector, and is connected on the outside of the column D with a U-shaped pipe, F'. The sections of this pipe F' enter the column, and are provided with numerous small perforations *n n*, as clearly shown in Fig. 1. The steam, as forced into the pipe F' by means of the injector F, is discharged in a fine spray, which drives the air, so as to permit its passing out of the column, and which permits the gas to freely ascend up through the column without having to overcome the resistance of atmospheric pressure.

What I claim as new, and desire to secure by Letters Patent of the United States, is—

1. The process of bleaching and drying saccharine juice, which consists in submitting the juice to the gases resulting from passing the fumes of sulphur through carbonate of soda, as set forth.

2. The combination of the injector F and perforated pipe F' and bleaching and drying column D, arranged to operate substantially as and for the purpose specified.

In testimony whereof I have signed my name to this specification before two subscribing witnesses.

FRANÇOIS RANDON.

Witnesses:

A. DUCATEL, Jr.,

PAUL DUCATEL.